Aug. 25, 1964  F. C. PITTMAN  3,145,776
HYDRA-JET TOOL
Filed July 30, 1962

INVENTOR.
FORREST C. PITTMAN
BY
ATTORNEYS

United States Patent Office 3,145,776
Patented Aug. 25, 1964

3,145,776
HYDRA-JET TOOL
Forest C. Pittman, Duncan, Okla., assignor to Halliburton Company, Duncan, Okla., a corporation of Delaware
Filed July 30, 1962, Ser. No. 213,440
1 Claim. (Cl. 166—55)

This invention relates to hydra-jet tools; that is, to well tools which are lowered into a well bore for the purpose of jetting abrasive fluid against the surrounding casing to produce a hole therein. Abrasive jetting tools of this type have an extremely short life. Some increase in tool life has been obtained by use of abrasive resistant nozzles formed of tungsten carbide or similar materials; however, in such cases the body of the tool is rapidly abraded by the rebounding abrasive, requiring frequent replacement of the entire tool.

A primary object of this invention is to provide a hydra-jet tool wherein the jetting nozzle is surrounded by an abrasive resistant material which extends axially to protect the body of the tool from abrasion due to rebound of the abrasive material.

A further object of this invention is to provide a hydra-jet tool wherein the abrasive resistant covering for the tool body is readily removed and replaced so that the tool body may have a relatively long service life.

With the above and other objects in view, as may appear hereinafter, reference is directed to the accompanying drawings in which.

Figure 1:
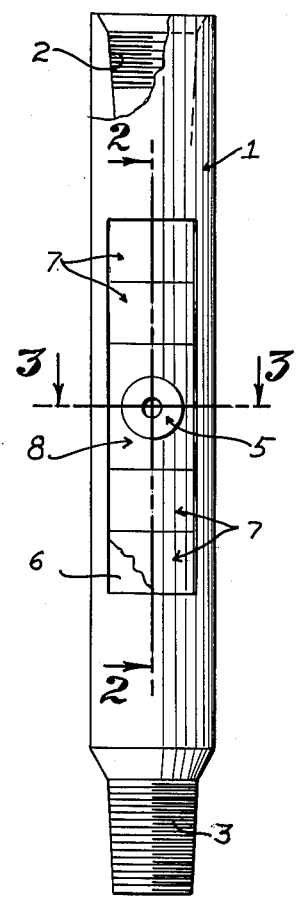
FIGURE 1 is a side view of the hydra-jet tool.
Figure 2:
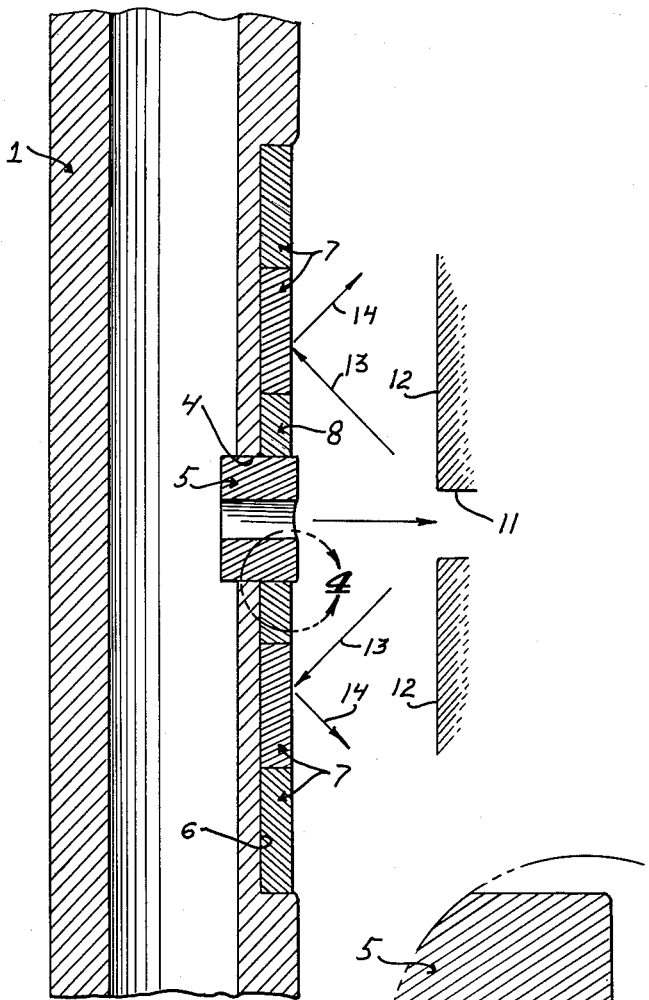
FIGURE 2 is a fragmentary enlarged longitudianl sectional view thereof taken through 2—2 of FIGURE 1, and indicating fragmentarily a portion of the surrounding well casing.
Figure 3:
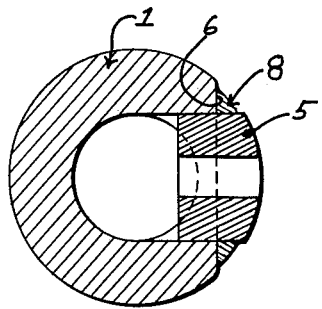
FIGURE 3 is an enlarged transverse sectional view taken through 3—3 of FIGURE 1.
Figure 4:
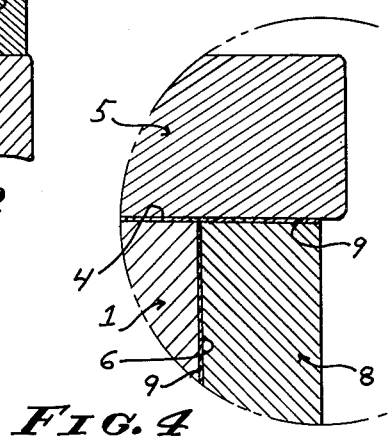
FIGURE 4 is a further enlarged sectional view taken within circle 4 of FIGURE 2.

The hydra-jet tool includes a tubular body 1 having relatively thick walls and provided with internal screw threads 2 at one end and external screw threads 3 at the other end so that the tubular body may be interposed in a tubing string. A series of the hydra-jet tools may be connected together.

Intermediate its ends, the tubular body is provided with a radially directed, nozzle-receiving bore 4 in which is fitted a nozzle insert 5 in the form of a short cylinder. The nozzle insert is made of abrasion resistant material such as tungsten carbide.

The side of the tubular body from which the nozzle insert extends is milled to form a flat surface 6. The flat surface surrounds the nozzle insert and extends axially with respect to the tubular body.

Mounted on the flat surface 6 is a series of wear plates 7 and surrounding the nozzle insert 5 is a special wear plate 8, having an opening therein to receive the nozzle insert. The wear plates 7 and 8 are formed of abrasion resistant material such as tungsten carbide.

The nozzle insert 5 and the wear plates 7 and 8 are joined to each other and to the tubular body by a bonding material 9 which melts or disintegrates at a temperature below the melting point of the tubular body or the inserts and wear plates. For example, the bonding material may be silver solder or a brazing material. The bonding material need not be metal; that is, it may be a resin capable of withstanding the normal temperatures of operation within a well bore, for example an epoxy resin.

The wear plates are rectangular or square in form. Their outer surfaces are ground or cast to conform to the curvature of the body 1. The outer end of the nozzle insert is similarly ground or cast so as to coincide with the cylindrical surface of the tubular body 1.

The hydra-jet tool is utilized as follows:

The tool is lowered on a tubing string to the desired level in a well bore, whereupon an abrasive-laden fluid is forced at high velocity through the bore of the nozzle insert 5. The resulting jet eventually forms a perforation 11 in the adjacent casing 12. During the operation of the jet, the abrasive material rebounds as indicated by the arrows 13 and 14 and a large percentage of the rebounding particles strike the wear plates rather than the tubular body so that the service life of the tool is materially increased.

While the hydra-jet tool is shown as provided with a single jetting nozzle, it should be understood that a plurality of such nozzles may be provided and that wear plates may be provided in the rebound areas in the vicinity of each nozzle.

By reason of the fact that the nozzle insert 5 and wear plates 7 and 8 are secured by a bonding material, which melts or disintegrates below the melting temperature of the tubular body, the nozzle inserts and wear plates may be replaced from time to time, thus greatly prolonging the service life of the tool body.

While a plurality of wear plates are illustrated, in some installations a single wear plate may be substituted.

While particular embodiments of this invention have been shown and described, it is not intended to limit the same to the exact details of the constructions set forth, and it embraces such changes, modifications, and equivalents of the parts and their formation and arrangement as come within the purview of the appended claim.

I claim:

An abrasive fluid jetting tool for well bores, comprising: a tubular body member including means at its extremities for attachment to a tubing string, one side of said body member having an outwardly extending nozzle bore and a flat face encircling said nozzle bore and extending axially from said nozzle bore on only said one side of said tubular body member, a wear resistant nozzle insert received in said nozzle bore and arranged to direct abrasive material against the well bore; and a plurality of wear plates substantially coextensive with and secured to said flat face and placed to intercept abrasive material rebounding from said well bore, one of said wear plates having an opening receiving said nozzle insert, all of said wear plates having an external surface shaped to conform to the external surface of said tubular body member whereby said plates taper in thickness from their midportions to their lateral edges.

References Cited in the file of this patent

UNITED STATES PATENTS

| | | |
|---|---|---|
| 2,260,487 | Scott | Oct. 28, 1941 |
| 2,302,567 | O'Neill | Nov. 17, 1942 |
| 2,315,496 | Boynton | Apr. 6, 1943 |
| 2,758,653 | Desbrow | Aug. 14, 1956 |
| 2,950,090 | Swart | Aug. 23, 1960 |
| 3,066,735 | Zingg | Dec. 4, 1962 |

OTHER REFERENCES

Western Co., "New Perforating Method Developed," Oil and Gas Journal, vol. 57, No. 25, June 15, 1959, pp. 68–70.